(12) United States Patent
Ko et al.

(10) Patent No.: US 8,406,935 B2
(45) Date of Patent: Mar. 26, 2013

(54) LOAD FORECASTING ANALYSIS SYSTEM FOR CALCULATING CUSTOMER BASELINE LOAD

(75) Inventors: Jong-Min Ko, Daejeon (KR);
Nam-Joon Jung, Daejeon (KR);
Young-Il Kim, Daejeon (KR); In-Hyeob Yu, Daejeon (KR)

(73) Assignee: Korea Electric Power Corporation, Gangnam-gu (KR)

( * ) Notice: Subject to any disclaimer, the term of this patent is extended or adjusted under 35 U.S.C. 154(b) by 572 days.

(21) Appl. No.: 12/566,950

(22) Filed: Sep. 25, 2009

(65) Prior Publication Data

US 2010/0082172 A1   Apr. 1, 2010

(30) Foreign Application Priority Data

Sep. 25, 2008   (KR) .................. 10-2008-0093934

(51) Int. Cl.
*G05D 3/12* (2006.01)
*G06Q 10/00* (2006.01)
*G06E 1/00* (2006.01)
(52) U.S. Cl. .......... 700/291; 700/295; 705/7.31; 706/21
(58) Field of Classification Search .................. 700/291, 700/295; 705/7.31; 706/21
See application file for complete search history.

(56) References Cited

U.S. PATENT DOCUMENTS

| 5,748,851 A * | 5/1998 | Iokibe et al. ..................... 706/58 |
| 2003/0200134 A1 * | 10/2003 | Leonard et al. ................. 705/10 |
| 2004/0102937 A1 * | 5/2004 | Ibrahim ............................. 703/2 |
| 2005/0004858 A1 * | 1/2005 | Foster et al. ..................... 705/36 |
| 2005/0192915 A1 * | 9/2005 | Ahmed et al. ................... 706/21 |
| 2006/0167591 A1 * | 7/2006 | McNally ......................... 700/291 |
| 2006/0178927 A1 * | 8/2006 | Liao ................................. 705/10 |
| 2008/0228680 A1 * | 9/2008 | Chen et al. ...................... 706/21 |
| 2009/0216469 A1 * | 8/2009 | Marik et al. ..................... 702/61 |

FOREIGN PATENT DOCUMENTS

| JP | 2007-108809 A | 4/2007 |
| JP | 2008-015921 A | 1/2008 |
| KR | 10-2006-0118371 A | 11/2006 |
| KR | 10-0681538 B1 | 2/2007 |

OTHER PUBLICATIONS

Coughlin et al., Estimating Demand Response Load Impacts: Evaluation of Baseline Load Models for Non-Residential Buildings in California, http://escholarship.org/uc/item/8jx6t5q9, May 20, 2008.*

Huang et al., Short-Term Load Forecasting Via ARMA Model Identification Including Non-Gaussian Process Considerations, IEEE, 2003.*

(Continued)

*Primary Examiner* — Jeffrey A Gaffin
*Assistant Examiner* — Darrin Dunn
(74) *Attorney, Agent, or Firm* — McDermott Will & Emery LLP

(57) ABSTRACT

A load forecasting analysis system for calculating a customer baseline load (CBL). The load forecasting analysis system includes a CBL forecaster for receiving a load profile and providing a CBL forecasting method, a period selector for selecting conditions used to calculate the CBL using the load profile, a CBL processor for calculating a forecasting value by forecasting the CBL using the CBL forecasting method according to the load profile and the conditions, and a CBL determiner for calculating an error value by comparing the load profile with the forecasting value.

6 Claims, 8 Drawing Sheets

OTHER PUBLICATIONS

Chen et al., Analysis of an adatpive time series autoregressive moving-average (ARMA) model for short-term load forecasting, Dept. of Elec. Eng., 1995.*

Alouani et al., A new technique for short-term residential electric load forecasting including weather and lifestyle influences, IEEE, 1992.*

Espinoza et al., Electric Load Forecasting, IEEE Control Systems Magazine, 2007.*

Japanese Office Action issued in Japanese Patent Application No. 2009-016551, dated Sep. 14, 2010.

Korean Office Action issued in Korean Patent Application No. 10-2008-0093934, dated Nov. 1, 20100.

* cited by examiner

FIG 3B

| details | | | | | | |
|---|---|---|---|---|---|---|
| time | amount of use | 10 Day | difference | 8 Day | difference | 3 Day | difference |
| 1 | 1.65 | 1.64 | -0.01 | 1.61 | -0.04 | 1.68 | 0.03 |
| 2 | 1.62 | 1.65 | 0.03 | 1.63 | 0.01 | 1.73 | 0.11 |
| 3 | 1.62 | 1.68 | 0.06 | 1.66 | 0.04 | 1.71 | 0.09 |
| 4 | 1.59 | 1.65 | 0.06 | 1.63 | 0.04 | 1.71 | 0.12 |
| 5 | 1.59 | 1.62 | 0.03 | 1.60 | 0.01 | 1.71 | 0.12 |
| 6 | 8.05 | 7.55 | -0.50 | 7.58 | -0.47 | 7.75 | -0.30 |
| 7 | 11.29 | 11.18 | -0.11 | 11.15 | -0.14 | 11.36 | 0.07 |
| 8 | 7.97 | 8.69 | 0.72 | 8.80 | 0.83 | 8.51 | 0.54 |
| 9 | 2.75 | 5.82 | 3.07 | 5.60 | 2.85 | 8.25 | 5.50 |
| 10 | 3.56 | 12.23 | 8.67 | 12.12 | 8.56 | 17.90 | 14.34 |
| 11 | 5.71 | 17.69 | 11.98 | 16.89 | 11.18 | 26.17 | 20.46 |
| 12 | 8.89 | 17.97 | 9.08 | 16.90 | 8.01 | 26.72 | 17.83 |
| 13 | 7.70 | 15.28 | 7.58 | 13.89 | 6.19 | 24.96 | 17.26 |
| 14 | 9.07 | 15.74 | 6.67 | 15.63 | 6.56 | 23.22 | 14.15 |
| 15 | 11.15 | 15.47 | 4.32 | 15.65 | 4.50 | 22.12 | 10.97 |
| 16 | 11.05 | 14.31 | 3.26 | 14.43 | 3.38 | 20.07 | 9.02 |
| 17 | 9.86 | 12.95 | 3.09 | 12.85 | 2.99 | 16.26 | 6.40 |
| 18 | 4.24 | 6.19 | 1.95 | 5.75 | 1.51 | 6.14 | 1.90 |
| 19 | 3.39 | 3.13 | -0.26 | 2.88 | -0.51 | 3.38 | -0.01 |
| 20 | 10.83 | 9.50 | -1.33 | 9.37 | -1.46 | 9.65 | -1.18 |
| 21 | 11.08 | 11.56 | 0.48 | 11.45 | 0.37 | 11.54 | 0.46 |
| 22 | 11.08 | 10.34 | -0.74 | 10.97 | -0.11 | 11.89 | 0.81 |
| 23 | 5.33 | 5.63 | 0.30 | 5.70 | 0.37 | 7.14 | 1.81 |
| 24 | 1.70 | 1.85 | 0.15 | 1.78 | 0.08 | 1.96 | 0.26 |
| sum | 152.77 | 211.32 | 58.99 | 207.52 | 55.30 | 273.53 | 120.76 |
| Event sum | 57.75 | 99.64 | 41.89 | 96.04 | 38.29 | 136.83 | 79.08 |

CBL select
● 10 Day Baseline   ○ 8 Day Baseline   ○ 3 Day Baseline

FIG 4B

| Forecasting result | | | | | | | | | |
|---|---|---|---|---|---|---|---|---|---|
| time | 10-31 | 11-01 | 11-02 | 11-05 | 11-06 | 11-07 | 11-08 | 11-09 | 11-12 | 11-13 |
| 1 | 23,907,600.12 | 23,712,800.96 | 23,800,638.70 | 23,828,247.01 | 23,807,202.55 | 23,804,378.74 | 23,808,927.02 | 23,808,911.32 | 23,808,007.76 | 23,808,125.70 |
| 2 | 23,224,525.83 | 23,035,292.36 | 23,120,620.45 | 23,147,439.95 | 23,126,996.76 | 23,124,254.61 | 23,248,671.97 | 23,128,656.71 | 23,127,778.97 | 23,127,893.54 |
| 3 | 23,224,525.83 | 23,035,292.36 | 23,120,620.45 | 23,147,439.95 | 23,126,996.76 | 23,124,254.61 | 23,248,671.97 | 23,128,656.71 | 23,127,778.97 | 23,127,893.54 |
| 4 | 23,224,525.83 | 23,035,292.36 | 23,120,620.45 | 23,147,439.95 | 23,126,996.76 | 23,124,254.61 | 23,248,671.97 | 23,128,656.71 | 23,127,778.97 | 23,127,893.54 |
| 5 | 23,224,525.83 | 23,035,292.36 | 23,120,620.45 | 23,147,439.95 | 23,126,996.76 | 23,124,254.61 | 23,248,671.97 | 23,128,656.71 | 23,127,778.97 | 23,127,893.54 |
| 6 | 23,224,525.83 | 23,035,292.36 | 23,120,620.45 | 23,147,439.95 | 23,126,996.76 | 23,124,254.61 | 23,248,671.97 | 23,128,656.71 | 23,127,778.97 | 23,127,893.54 |
| 7 | 23,907,600.12 | 23,712,800.96 | 23,800,638.70 | 23,828,247.01 | 23,807,202.55 | 23,804,379.74 | 23,808,927.02 | 23,808,911.32 | 23,808,007.76 | 23,808,125.70 |
| 8 | 25,956,822.98 | 25,745,326.76 | 25,840,693.45 | 25,870,668.18 | 25,847,819.91 | 25,844,755.15 | 25,849,692.20 | 25,849,675.15 | 25,848,6944.14 | 25,848,822.19 |
| 9 | 30,055,268.72 | 29,810,378.35 | 29,920,802.94 | 29,955,510.52 | 29,929,054.63 | 29,925,505.97 | 29,931,222.54 | 29,931,202.80 | 29,930,066.90 | 29,930,215.17 |
| 10 | 32,787,565.88 | 32,520,412.75 | 32,640,875.93 | 32,678,738.75 | 32,649,877.78 | 32,646,006.51 | 32,652,242.78 | 32,652,221.24 | 32,650,982.07 | 32,651,143.82 |
| 11 | 33,470,310.16 | 33,197,921.34 | 33,320,894.18 | 33,359,545.81 | 33,330,083.56 | 33,326,131.64 | 33,332,497.83 | 33,332,475.85 | 33,331,210.86 | 33,331,375.98 |
| 12 | 33,470,310.16 | 33,197,921.34 | 33,320,894.18 | 33,359,545.81 | 33,330,083.56 | 33,326,131.64 | 33,332,497.83 | 33,332,475.85 | 33,331,210.86 | 33,331,375.98 |
| 13 | 30,738,343.01 | 30,487,886.95 | 30,600,821.18 | 30,636,317.58 | 30,609,260.42 | 30,605,631.10 | 30,611,477.60 | 30,611,457.41 | 30,610,295.69 | 30,610,447.33 |
| 14 | 32,787,565.88 | 32,520,412.75 | 32,640,875.93 | 32,678,738.75 | 32,649,877.78 | 32,646,006.51 | 32,652,242.78 | 32,652,221.24 | 32,650,982.07 | 32,651,143.82 |
| 15 | 33,470,640.16 | 33,197,921.34 | 33,320,894.18 | 33,359,545.81 | 33,330,083.56 | 33,326,131.64 | 33,332,497.83 | 33,332,45.85 | 33,331,210.86 | 33,331,375.98 |
| 16 | 33,470,640.16 | 33,197,921.34 | 33,320,894.18 | 33,359,545.81 | 33,330,083.56 | 33,326,131.64 | 33,332,497.83 | 33,332,45.85 | 33,331,210.86 | 33,331,375.98 |
| 17 | 32,787,565.88 | 32,520,412.75 | 32,640,875.93 | 32,678,738.75 | 32,649,877.78 | 32,646,006.51 | 32,652,242.78 | 32,652,221.24 | 32,650,982.07 | 32,651,143.82 |
| 18 | 31,421,417.30 | 31,165,395.55 | 32,280,839.43 | 31,317,124.64 | 31,289,466.20 | 31,285,756.24 | 31,291,732.66 | 31,291,712.02 | 31,290,524.48 | 31,290,679.49 |
| 19 | 30,738,343.01 | 30,487,886.95 | 30,600,821.18 | 30,636,317.58 | 30,609,260.42 | 30,605,631.10 | 30,611,477.60 | 30,611,457.41 | 30,610,295.69 | 30,610,447.33 |
| 20 | 29,372,194.43 | 29,132,869.75 | 29,240,784.69 | 29,274,703.47 | 29,248,848.84 | 29,245,380.83 | 29,250,967.49 | 29,250,948.19 | 29,249,838.11 | 29,249,983.00 |
| 21 | 28,689,120.14 | 28,455,631.15 | 28,560,766.44 | 28,593,896.41 | 28,568,643.06 | 28,565,255.69 | 28,570,712.43 | 28,570,693.58 | 28,569,609.31 | 28,569,750.84 |
| 22 | 27,322,971.56 | 27,100,343.95 | 27,200,729.94 | 27,232,282.29 | 27,208,231.48 | 27,205,005.42 | 27,210,202.31 | 27,210,184.37 | 27,209,151.73 | 27,209,286.51 |
| 23 | 26,639,897.27 | 26,422,835.36 | 26,520,711.69 | 26,551,475.24 | 26,528,025.69 | 26,524,880.29 | 26,529,947.26 | 26,529,929.76 | 26,528,922.93 | 26,529,054.35 |
| 24 | 25,956,822.98 | 25,745,326.76 | 25,840,693.45 | 25,870,668.18 | 25,847,819.91 | 25,844,755.15 | 25,849,692.20 | 25,849,675.15 | 25,848,694.14 | 25,848,822.19 |

LOAD FORECASTING ANALYSIS SYSTEM FOR CALCULATING CUSTOMER BASELINE LOAD

CROSS REFERENCE TO RELATED APPLICATION

This application claims priority from and the benefit of Korean Patent Application No. 10-2008-0093934, filed on Sep. 25, 2008, which is hereby incorporated by reference for all purposes as if fully set forth herein.

BACKGROUND OF THE INVENTION

1. Field of the Invention

The present invention relates to a load forecasting analysis system, and more particularly, to a load forecasting analysis system for calculating a customer baseline load.

2. Discussion of the Related Art

As a conventional customer baseline load (CBL) forecasting method, a method (a regression model considering an average value and a weather factor) has been used to forecast a CBL per time period of a forecasting date employing past 15-minute load profile data. The method using the average value includes 10-day baseline, 8-day baseline, 5-day baseline, 3-day baseline, and time series analysis methods. In these methods, however, since a load characteristic varies according to operating environments and weather conditions, appropriate coordination elements and ratios should be applied by analyzing a correlation between seasonal factors and environment factors (temperature, humidity, discomfort index, etc.). The CBL may be forecast using the time series analysis method (e.g., a moving average method, exponential smoothing method, or autoregressive moving average model), which is a statistic analysis scheme.

In America etc., the above-described CBL forecasting methods have been used for calculation and determination for load reduction of customers. To apply these methods, a reliable procedure suitable for the electric power industry is required and an undistorted baseline load appropriate for demand characteristics for respective customers should be established.

SUMMARY OF THE INVENTION

The present invention provides an optimal CBL forecasting method which forecasts a CBL which becomes a basis for efficient effect analysis for load transfer event and yielding of amount of load transfer and applies a minimum error value by comparing errors between a forecasting load profile with a real-time load profile in a demand response system of a market-oriented demand management scheme, thereby improving the reliability of the CBL forecasting method.

The present invention also provides a system for supporting reasonable electric power consumption policy and forecasting and managing peak electric power, by forecasting total amount of electric power use and the amount of short-term electric power consumption at intervals of 15 minutes by class of industry and class of contract according to a CBL and by selecting an optimal short-term forecasting value as a result of comparing forecast models.

In one embodiment, a load forecasting analysis system for calculating a customer baseline load (CBL) includes a CBL forecaster for receiving a load profile and providing a CBL forecasting method, a period selector for selecting conditions used to calculate the CBL using the load profile, a CBL processor for calculating a forecasting value by forecasting the CBL using the CBL forecasting method according to the load profile and the conditions, and a CBL determiner for calculating an error value by comparing the load profile with the forecasting value.

The load profile may be a 15-minute interval load profile converted into a relational database.

The CBL forecasting method may include at least one of a method using an average load profile for n days (where n is 10, 5, or 3) immediately before a forecasting date and a method using an average load profile for 8 days excluding maximum and minimum load profile values out of the load profile for 10 days immediately before the forecasting date.

The method using the average load profile for n days immediately before the forecasting date may calculate a forecasting value $F_t$ at a time t using equation $$F_t = \frac{1}{n}(D_{t-1} + D_{t-2} + \ldots + D_{t-n}) \times \alpha$$

where $D_t$ denotes an actual load profile at the time t, and $\alpha$ denotes an external correlation parameter.

The method using an average load profile for 8 days excluding maximum and minimum load profiles of the 10-day load profile immediately before the forecasting date may calculate a forecasting value $F_t$ at a time t using equation $$F_t = \frac{1}{8}(D_{t-1} + D_{t-2} + \ldots + D_{t-10} - D_{max} - D_{min}) \times \alpha$$

where $D_t$ denotes an actual load profile at the time t, $D_{max}$ denotes the maximum load profile, $D_{min}$ denotes the minimum load profile, and $\alpha$ denotes an external correlation parameter.

The conditions may include at least one of an analysis object period for calculating the forecasting value, an event time period, and an incentive for calculating a reduction cost for reduced electric power use.

The load forecasting analysis system may further includes a short-term demand forecaster for receiving the load profile and providing a future value forecasting method of the load profile, a forecasting processor for forecasting the amount of electric power use using various parameters and options used in the short-term demand forecaster, and a forecasting determiner for forecasting the total amount of electric power use and the amount of short-term electric power consumption by class of industry and class of contract at intervals of 15 minutes according to a customer classification reference and selects a short-term forecasting model by comparing forecast models.

The future value forecasting method may include at least one of a method using an average load profile for 10 days immediately before a forecasting date, a method using an average load profile for 8 days excluding maximum and minimum load profile values out of the load profile for 10 days immediately before a forecasting date, and a time series analysis method, and the time series analysis method includes at least one of a moving average method, an exponential smoothing method, and an autoregressive moving-average (ARMA) model.

The moving average method may calculate a future value $F_t$ at a time t using equation $$F_t = \frac{1}{m}(D_{t-1} + D_{t-2} + \ldots + D_{t-m})$$

where m denotes a moving average period and $D_t$ denotes an actual value at the time t, the moving average period is determined as a value having, as a minimum value, mean square of a forecasting error after one period within a measurement period, and the forecasting error is $(D_t-F_t)$.

The exponential smoothing method may calculate a future value $F_t$ at a time t using equation $F_t=F_{t-1}+\alpha(D_{t-1}-F_{t-1})$ where $F_{t-1}$ denotes a future value at a time (t-1), $\alpha$ denotes a smoothing constant, and $(D_{t-1}-F_{t-1})$ denotes a forecasting error $e_t$ at the time (t-1).

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather these embodiments are provided so that this disclosure is thorough, and will fully convey the scope of the invention to those skilled in the art.

Figure 1:
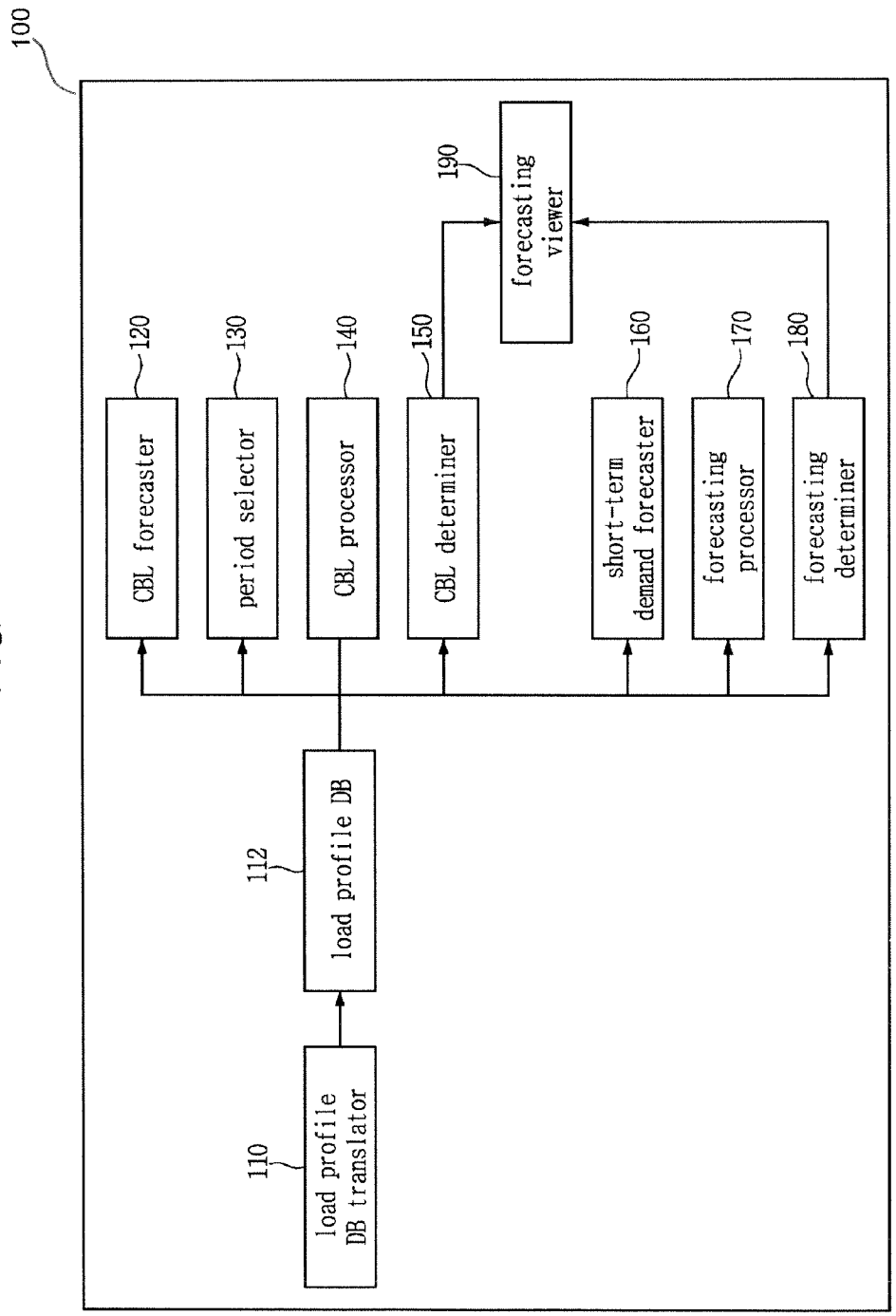
FIG. 1 is a block diagram of a load forecasting analysis system according to an exemplary embodiment of the present invention.

FIG. 1 is a block diagram of a load forecasting analysis system according to an exemplary embodiment of the present invention. Referring to FIG. 1, a load forecasting analysis system 100 includes a load profile database (DB) translator 110, a customer baseline load (CBL) forecaster 120, a period selector 130, a CBL processor 140, a CBL determiner 150, a short-term demand forecaster 160, a forecasting processor 170, a forecasting determiner 180, and a forecasting viewer 190.

The load profile DB translator 110 converts a real-time 15-minute interval load profile into a relational DB and stores the converted DB in a load profile DB 112. The real-time 15-minute interval load profile is used to estimate a CBL and to forecast future short-term demand and may be time interval demand data generated by a digital watt-hour meter of a user. The user may be a customer using a high voltage of 130,050 KW or above.

The CBL forecaster 120 receives the 15-minute interval load profile from the load profile DB 112 as input and provides CBL forecasting methods. For example, the CBL forecaster 120 may provide a method using an average load profile for 10 days immediately before a forecasting date, a method using an average load profile for 8 days excluding maximum and minimum load profile values out of the load profile for 10 days immediately before a forecasting date, a method using an average load profile for 5 days immediately before a forecasting date, and a method using an average load profile for 3 days immediately before a forecasting date according to each analysis object period.

For a day period to be applied to forecasting based on a forecasting date, it is preferable to use only weekdays, excluding weekends, holidays, and days for event. Such a forecasting method considers past data to be as important as present ones and is based on the assumption that the past data is an index of the future.

The period selector 130 may select an analysis object period, an event time period, and an incentive to calculate a CLB using the demand-side 15-minute interval load profile stored in the load profile DB 112. The incentive serves to calculate a reduction cost for reduced electric power use.

The CBL processor 140 calculates a forecasting value by estimating a CBL using a CBL forecasting method selected among the CBL forecasting methods provided by the CBL forecaster 120, according to the demand-side 15-minute interval load profile stored in the load profile DB 112 and to a selection option provided by the period selector 130. Here, the forecast CBL may be a short-term load profile.

The CBL determiner 150 calculates an error value by comparing and analyzing the forecasting value calculated by the CBL processor 140 and the real-time 15-minute interval load profile stored in the load profile DB 112 and provides information such as the amount of real-time electric power use, the reduced amount of electric power use, an incentive cost, and the amount of carbon dioxide ($CO_2$) emissions. In this case, the error value refers to a forecasting error $e_t$ which is a difference between an actual load profile $D_t$ of a forecasting date and a forecast load profile $F_t$. Namely, the forecasting error $e_t$ may be calculated by $D_t-F_t$. The CBL determiner 150 may graphically provide data for tendency for the calculated error value and for error determination through a graphical user interface.

Figure 2:
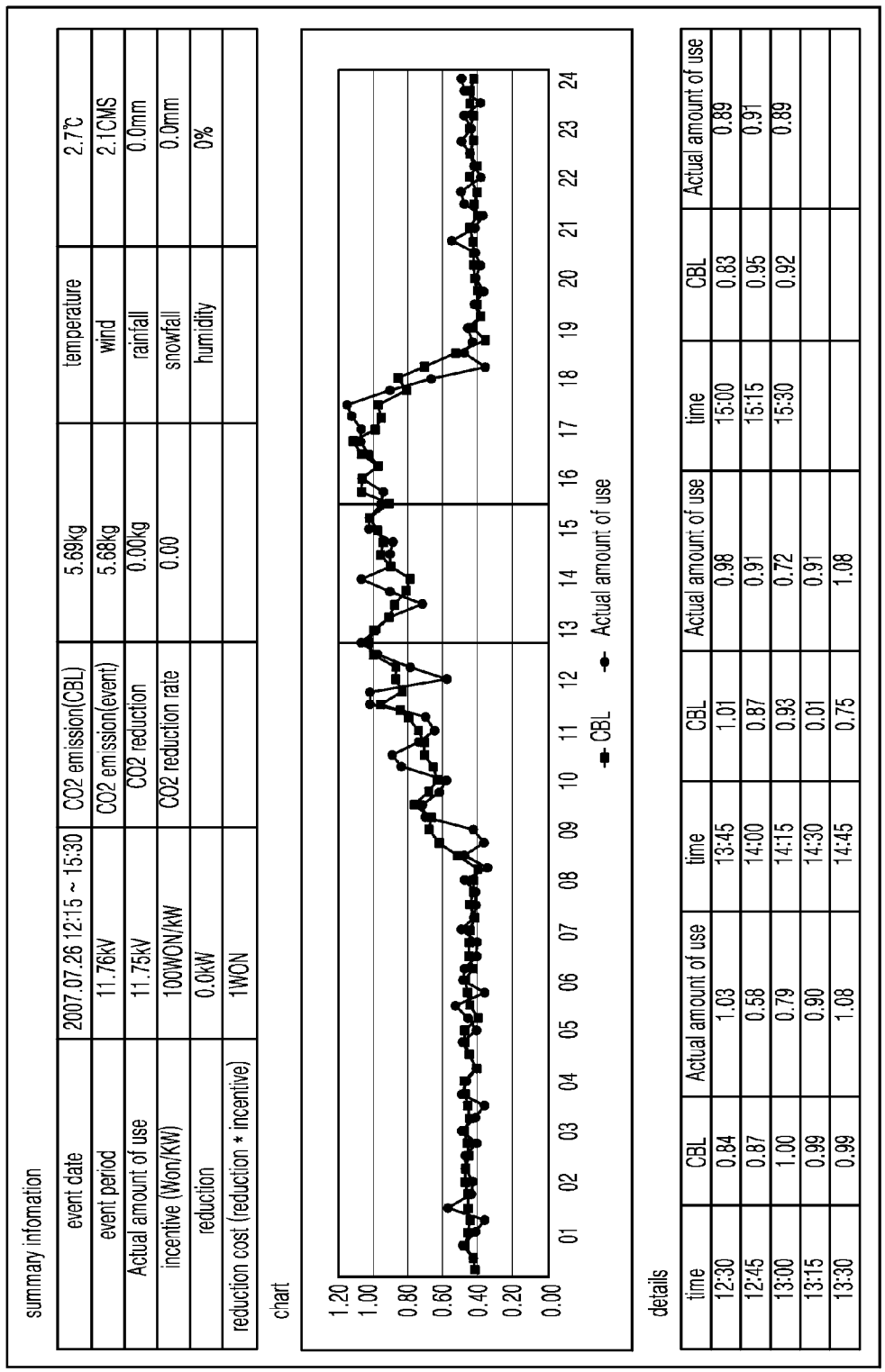
FIGS. 2 and 3 illustrate a process that the CBL processor and the CBL determiner simulate an actual gain on a day for an event according to selected conditions.

A process that the CBL processor 140 and the CBL determiner 150 simulate an actual gain on a day for an event according to selected conditions is illustrated in FIGS. 2 and 3. Summary information in FIG. 2 includes event date and time period, CBL in event period, actual amount of use in event period, incentive, reduction in event period, reduction cost which is the sum of reduction and incentive, amount of CO2 emission, and amount and rate of CO2 reduction. In chart, a forecasting value of CBL and an actual amount of use are shown. And, detailed information on a forecasting value of CBL and an actual amount of use is presented at intervals of 15 minutes.

Figure 3A:
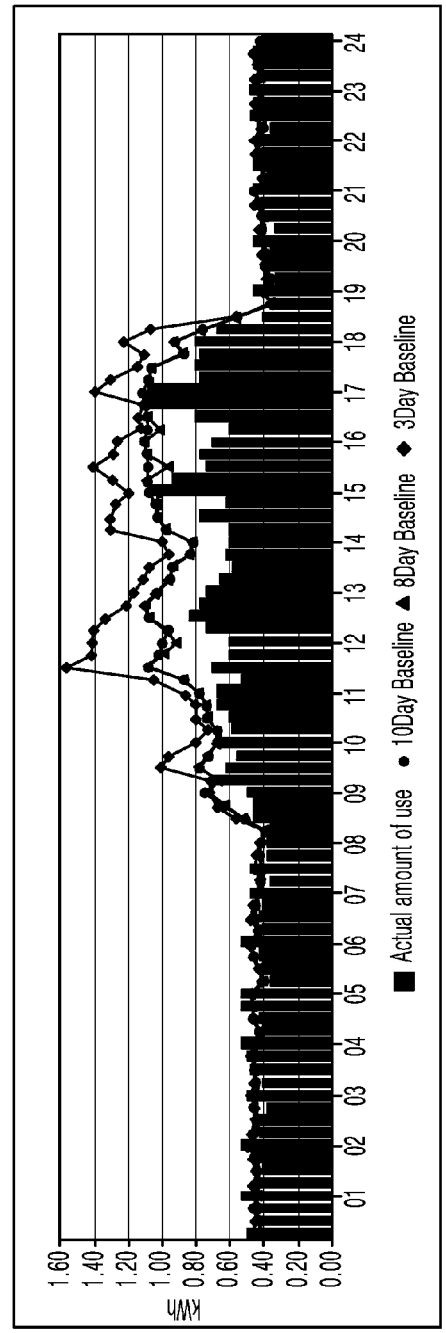

Conditions of inquiring in FIG. 3a includes selecting a CBL type which means to select an analysis object period, determining a time period to be inquired for, and writing down an incentive. Summary information according to a CBL type shows a forecasting value of CBL, an actual amount of use, reduction according to a time period of 13:00 to 18:00 and overall information. And in chart, forecasting values for 3 types of CBL are graphically presented. In FIG. 3b, an actual amount of use and forecasting values of 3 different types of CBL are shown.

The load forecasting analysis system of the embodiment may determine an optimal CBL forecasting method according to customers, based on such a simulation result. The load forecasting analysis system provides a 15-minute interval electric power demand forecasting value and the reduced amount (cost) of electric power use, thereby supporting strategies for reasonable energy use of customers. Moreover, the load forecasting analysis system provides an overall analysis function such as the forecast amount of electric power use, the reduced amount of electric power use, an incentive cost, and the amount of $CO_2$ emissions, during an event period.

The short-term demand forecaster 160 may forecast short-term demand, using a method using an average load profile for 10 days immediately before a forecasting date, a method using an average load profile for 8 days excluding maximum and minimum load profile values out of the load profile for 10 days immediately before a forecasting date, or a time series analysis method. The time series analysis method includes a moving average method, an exponential smoothing method, and an autoregressive moving-average (ARMA) model.

The above-described methods forecast a future value of a load profile by smoothing an irregular variation and may be applied to a horizontal series because an average level of each time period of a measured load profile as a result of previous load profile analysis is not greatly varied, that is, has a characteristic including only irregular variation.

The forecasting processor 170 forecasts the amount of electric power use using various parameters and options used in the short-term demand forecaster 160 and registers the forecasting result.

The forecasting determiner 180 forecasts short-term electric power consumption according to the customer classification used in the forecasting processor 170 which includes a class of industry, class of contract and the total amount of electric power use, at intervals of 15 minutes, and selects an optimal short-term forecasting model by comparing forecast models. The forecasting determiner 180 may graphically provide tendency of a calculated result value through a graphic user interface.

Figure 4A:
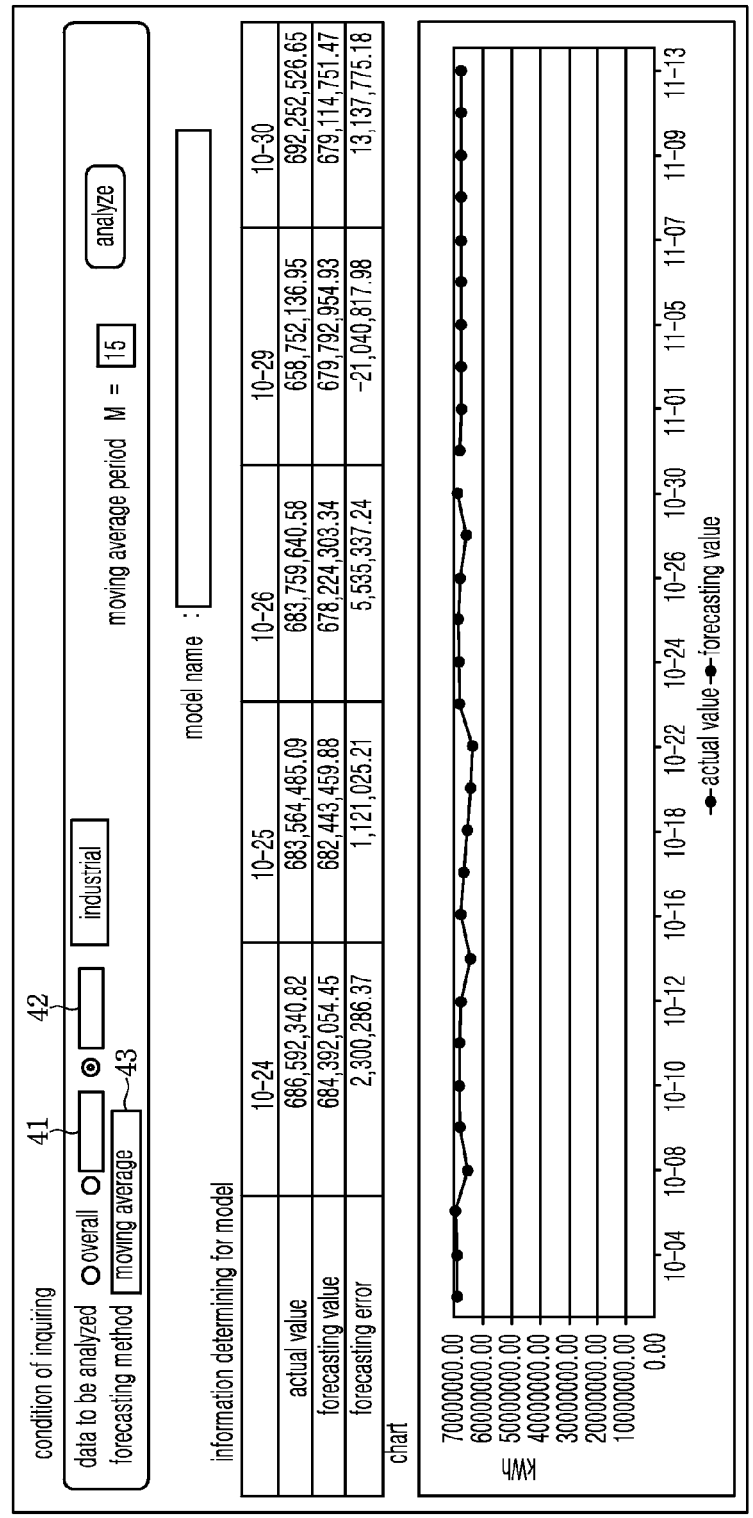
FIGS. 4 and 5 illustrate a simulation process in which the forecasting processor and the forecasting determiner forecast electric power use and select an optimal short-term forecasting model.
Figure 4C:
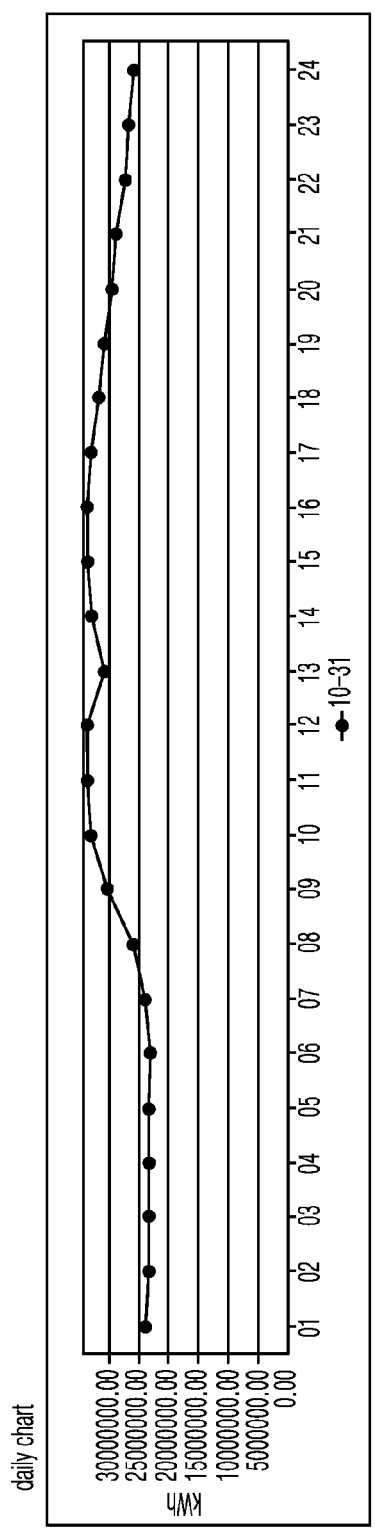
Figure 5:
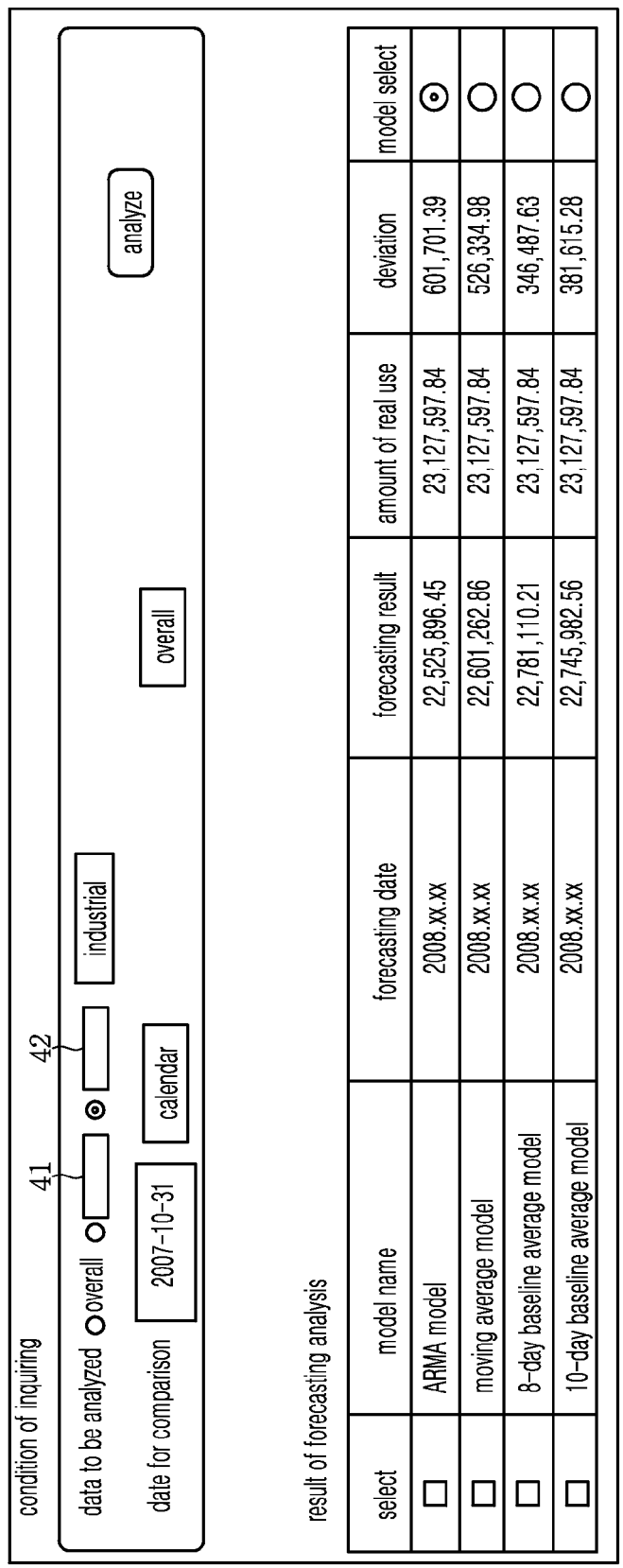

A simulation process in which the forecasting processor 170 and the forecasting determiner 180 forecast electric power use and select an optimal short-term forecasting model is illustrated in FIGS. 4 and 5.

As illustrated in FIGS. 4 and 5, the system of the embodiment provides a 15-minute demand forecasting value for 10 days according to forecasting methods by class of industry 41, class of contract 42, and total high-voltage customers so as to be used as data for electricity purchase policy of an electric power enterpriser and calculation of an electricity rate.

Class of industry 41 may include agricultural, forestry, fishery, mining, aid service for mining, various kind of manufacturing, providing, construction industry, and so on. Class of contract 42 may include general, residential, industrial, educational (low power voltage), temporary power (low voltage power), temporary power (high voltage power), agricultural, streetlights, late night power. A forecasting method can be selected among ARMA model, moving average mode, 8-day baseline average model and 10-day baseline average model from a selection box 43.

Information determining for model in FIG. 4a includes real value, prediction value and prediction error according to 5 days. And as represented in chart, forecast values calculated from actual amount of use for previous days before forecasting date are graphically represented. Forecasting result in FIG. 4b, prediction value and real value are shown for 10 days. In chart per a day of FIG. 4c, forecasting result of a day is shown graphically.

Condition of inquiring in FIG. 5, for an analysis, includes data for analysis and date for comparison. And a result of analysis for forecasting according to each of 4 models is shown by deviation which may have the forecasting determiner 180 select an optimal model.

The forecasting viewer 190 stores an analyzed result received from the CBL determiner 150 and the forecasting determiner 180 or generates a report.

CBL forecasting methods provided by the CBL forecaster 120 will now be described in more detail. First, a method using a load profile for 10 days immediately before a forecasting date may be expressed by the following Equation 1.

$$F_t = \frac{1}{10}(D_{t-1} + D_{t-2} + \ldots + D_{t-10}) \times \alpha \quad \text{[Equation 1]}$$

where $F_t$ denotes a forecasting value on a forecasting date based on the load profile for past 10 days, $D_t$ denotes an actual value at a time point t, and $\alpha$ denotes an external correlation parameter. The external correlation parameter includes parameters of temperature, humidity, discomfort index, sales cost, etc.

And, a method using an average for 8 days excluding maximum and minimum load profiles of the 10-day load profile immediately before the forecasting date may be expressed by the following Equation 2.

$$F_t = \frac{1}{8}(D_{t-1} + D_{t-2} + \ldots + D_{t-10} - D_{max} - D_{min}) \times \alpha \quad \text{[Equation 2]}$$

where $D_{max}$ denotes a maximum load profile and $D_{min}$ denotes a minimum load profile.

And, a method using a load profile for 5 days immediately before the forecasting date may be expressed by the following Equation 3.

$$F_t = \frac{1}{5}(D_{t-1} + D_{t-2} + \ldots + D_{t-5}) \times \alpha \quad \text{[Equation 3]}$$

Finally, a method using a load profile for 3 days immediately before the forecasting date may be expressed by the following Equation 4.

$$F_t = \frac{1}{3}(D_{t-1} + D_{t-2} + D_{t-3}) \times \alpha \quad \text{[Equation 4]}$$

The forecasting method used by the short-term forecaster 160 will now be described in more detail. As one embodiment, the moving average method among the time series analysis method may be expressed by the following Equation 5.

$$F_t = \frac{1}{m}(D_{t-1} + D_{t-2} + \ldots + D_{t-m}) \quad \text{[Equation 5]}$$

where $F_t$ denotes a forecasting value at a time t, $D_t$ denotes an actual value at the time t, and m denotes a moving average period. That is, the moving average method serves to forecast a forecasting value of a next time point by a moving average for a recent period of m. The moving average method may have different forecasting values according to the moving average period m unlike the above-described 10-day average method or 8-day average method. Especially, the longer the moving average period may be set, the more the unintended factors may be offset, thereby the forecasting values become uniform. However, the forecasting values may react slowly to actual variation. Therefore, the moving average period may be optimally selected in consideration of stability of forecasting and a tradeoff relationship reacting to a demand variation.

An optimal selection method of the moving average period may be obtained by determining the value m which has a minimum value of mean square of a forecasting error after one period within a measurement period and this may be expressed as follows.

$$MSE(m) = \frac{1}{n}\sum_{1}^{n}(D_t - F_t)^2 \quad \text{[Equation 6]}$$

In Equation 6, provided the forecasting period m is 4, the mean square of the forecasting error is as follows.

$$MSE(m) = \frac{1}{n}\sum_{1}^{n}(D_t - F_t)^2 \quad \text{[Equation 7]}$$
$$= \frac{63.12^2 + 53.52^2 + \ldots + 227.16^2 + 237.36^2}{7}$$
$$= 16883.72$$

Since the forecasting value varies with the forecasting period, it is desirable to optimally select the moving average period m.

Next, the exponential smoothing method among the time series analysis method uses only a measurement value of a recent period m to calculate a moving average and the same weight is assigned to complement a shortcoming of the moving average method. This may be expressed as follows.

$$F_t = \alpha D_{t-1} + (1-\alpha)F_{t-1} \quad \text{[Equation 8]}$$

where $\alpha$ denotes a smoothing constant having a value between 0 and 1 and indicates a relative weight for a current measured demand. The smoothing constant determines a speed reacting to a smoothing degree and a difference between a forecasting value and an actual value. As a value of the smoothing constant is increased, the forecasting value reacts increasingly to demand variation. Accordingly, the lower the smoothing value, the greater the smoothing effect.

Equation 8 may be expressed in brief as follows.

$$F_t = F_{t-1} + \alpha(D_{t-1} - F_{t-1}) \quad \text{[Equation 9]}$$

where $(D_{t-1} - F_{t-1})$ denotes a forecasting error $e_t$ at a time (t−1). A forecasting value $F_t$ at a time t is a sum of a forecasting value $F_{t-1}$ at a time (t−1) and ($\alpha \times$ forecasting error) at the time (t−1). Therefore, when $\alpha$, $D_{t-1}$, and $F_{t-1}$ are given, $F_t$ can be calculated.

The autoregressive moving-average (ARMA) model among the time series analysis method refers to a probability process including both an autoregressive (AR) method and a moving average (MA) method. A general form of ARMA(p, q) model is as follows.

$$D_t = \Phi_1 D_{t-1} + \ldots + \Phi_p D_{t-p} + e_t - \theta_1 D_{t-1} - \ldots - \theta_q D_{t-q}, \text{ or}$$
$$\Phi_p(B)D_t = \theta_q(B)e_t \quad \text{[Equation 10]}$$

where $\Phi(B)$ denotes an operator of an AR(p) process, $\Phi_p(B) = 1 - \Phi_1 B - ; \ldots - \Phi_p B^p$, and $\theta(B)$ denotes an operator of an MA(q) process, and $\theta_q(B) = 1 - \theta_1 B - ; \ldots - \theta_q B^q$, and $e_t$ denotes a white noise process in which the average is 0 and the variance is $\sigma_e^2$. An autocorrelation function (ACF) of ARMA (p, q) model is decreased exponentially after a time difference q, like the AP(p) model. This is because the ACF of the ARMA model depends only on an AR parameter. Since the ARMA model includes an MA model as a specific case, a partial autocorrelation function (PACF) of the ARMA model shows a mixed form of an exponential decrease and a sine curve depending on solutions of $\Phi(B)=0$ and $\theta(B)=0$. The methods applied as the embodiment of the present invention can forecast total entire electric power demand, and short-term electric power demand by class of contract and class of industry, using a 15-minute interval load profile of actual users.

As described above, since the load forecasting analysis system for calculating a CBL can forecast an optimal CBL by comparing a forecasting load profile with a real-time load profile, a new added value is created through demand of an electricity market. Moreover, electric power demand is forecast by efficiently and actively coping with various changes of an electric power market and system, resulting in reasonable consumption.

Furthermore, the load forecasting analysis system of the present invention increases reliability by forecasting electric power demand based on electric power consumption data of actual users. Since an optimal 15-minute short-term forecasting value is provided, the load forecasting analysis system of the present invention may be utilized as a means for supporting reasonable electric power consumption policy and forecasting and managing peak electric power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A load forecasting analysis system for calculating a customer baseline load (CBL), comprising:
    a CBL forecaster for receiving a load profile and providing a CBL forecasting method;
    a period selector for selecting conditions used to calculate the CBL using the load profile;
    a CBL processor for calculating a forecasting value of the CBL using the CBL forecasting method according to the load profile and the selected conditions;
    a CBL determiner for calculating an error value by comparing the load profile with the forecasting value;
    a short-term demand forecaster for receiving the load profile and providing a future value forecasting method of the load profile;
    a forecasting processor for forecasting an amount of electric power use using various parameters and options used in the short-term demand forecaster; and
    a forecasting determiner for forecasting a total amount of electric power use and an amount of short-term electric power consumption by class of industry and class of contract according to a customer classification reference and selecting a short-term forecasting model by comparing forecast models, wherein
    the future value forecasting method includes at least one of a method using an average load profile for 10 days immediately before a forecasting date, a method using an average load profile for 8 days excluding maximum and minimum load profile values out of the load profile for 10 days immediately before a forecasting date, and a time series analysis method, and the time series analysis method includes at least one of a moving average method, an exponential smoothing method, and an autoregressive moving-average (ARMA) model.

2. The load forecasting analysis system of claim 1, wherein the load profile is a 15-minute interval load profile converted into a relational database.

3. The load forecasting analysis system of claim 1, wherein the CBL forecasting method includes at least one of a method using an average load profile for n days (where n is 10, 5, or 3) immediately before a forecasting date and a method using an average load profile for 8 days excluding maximum and minimum load profile values out of the load profile for 10 days immediately before the forecasting date.

4. The load forecasting analysis system of claim 1, wherein the conditions include at least one of an analysis object period for calculating the forecasting value, an event time period, and an incentive for calculating a reduction cost for reduced electric power use.

5. The load forecasting analysis system of claim 1, wherein the moving average method calculates a future value $F_t$ at a time t using equation $$F_t = \frac{1}{m}(D_{t-1} + D_{t-2} + \ldots + D_{t-m})$$

where m denotes a moving average period and $D_t$ denotes an actual value at the time t, the moving average period is determined as a value which has a minimum value of mean square of a forecasting error after one period within a measurement period, and the forecasting error is (Dt−Ft).

6. The load forecasting analysis system of claim 1, wherein the exponential smoothing method calculates a future value $F_t$ at a time t using equation $F_t = F_{t-1} + \alpha(D_{t-1} - F_{t-1})$ where $F_{t-1}$ denotes a future value at a time (t−1), $\alpha$ denotes a smoothing constant, and $(D_{t-1} - F_{t-1})$ denotes a forecasting error at the time (t−1).

* * * * *